Dec. 14, 1948.  W. J. BOYD, JR  2,455,973
KEYWAY CUTTER HOLDER
Filed June 27, 1945

INVENTOR
William J. Boyd, Jr.
BY John E. Jackson
ATTORNEY

Patented Dec. 14, 1948

2,455,973

UNITED STATES PATENT OFFICE 2,455,973

KEYWAY CUTTER HOLDER

William J. Boyd, Jr., Pittsburgh, Pa.

Application June 27, 1945, Serial No. 601,898

3 Claims. (Cl. 29—96)

This invention relates to an improved tool holder for a metal cutting tool, and more particularly to a holder for a keyway cutter.

The invention has among its objects the provision of a tool holder for a metal cutting tool, and more particularly a keyway cutter, wherein the cutter is held more tightly and accurately and with less tendency to be deflected while cutting than in prior tool holders of such type.

A further object of the invention is the provision of a keyway cutter holder having such design that it may be manufactured by fast, accurate, and economical methods.

These and further objects of the invention will be more fully apparent in the following description.

Keyways in shafts and in hubs of wheels, gears, and the like are conventionally machined by positioning the article in a workholder on a table and reciprocating a metal cutting tool in the nature of a shaper tool in contact with the surface to be cut, the tool being fed toward the work an increment on each reciprocation. It is necessary, if the keyway is to be cut accurately, that the cutting tool be held firmly and unyieldingly. This is difficult, particularly in the case of cutters cutting keyways through hubs of articles, such as wheels and gears, due to the limitation of size of the cutter holder since it must past freely through the bore of the article being machined. The keyway cutter holder of the present invention solves difficulties heretofore experienced in tool holders of this type, such as lack of permanence and accuracy of holding of the tool, and in addition is of such design that the tool holding slot thereon may be made much more cheaply and accurately, by the use of a fast metal cutting operation such as milling, than was possible in making prior tool holders.

The invention will be more readily understood by reference to the accompanying drawings, in which.

Figure 1:
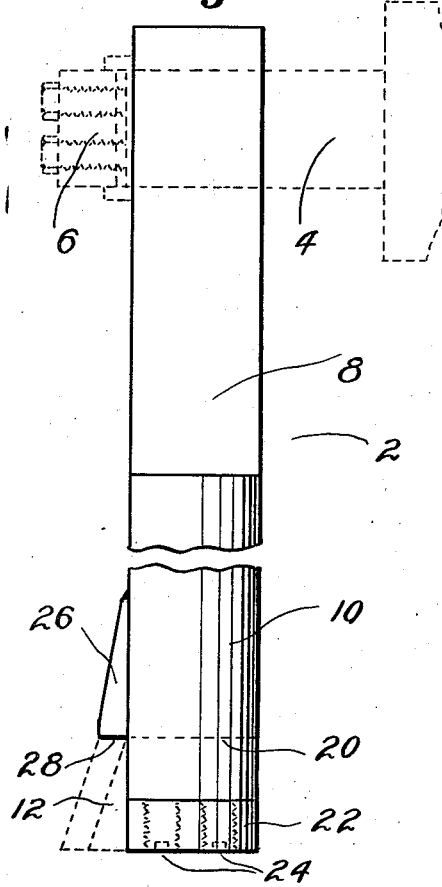
Figure 1 is a view in side elevation of a keyway cutter holder made in accordance with the present invention, said holder being mounted on the arm of a key slotting machine.
Figure 2:
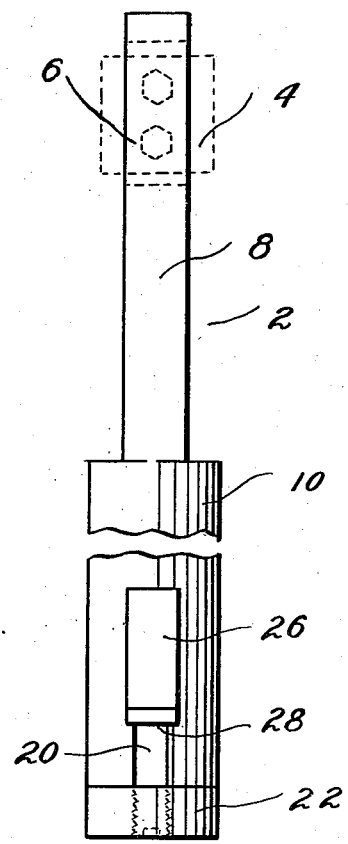
Figure 2 is a view in front elevation of the cutter holder shown in Figure 1, the cutter being removed.
Figure 3:
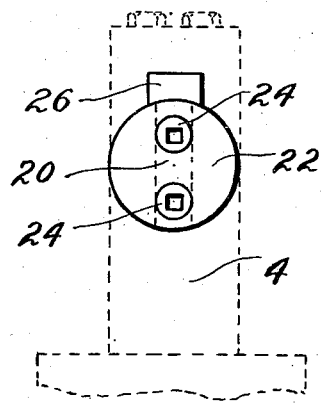
Figure 3 is a bottom view of the holder shown in Figure 2.
Figure 4:
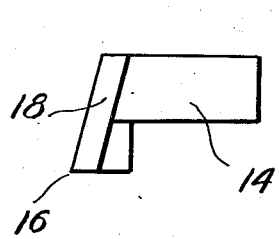
Figure 4 is a view in side elevation of the keyway cutter employed with the tool holder.

The cutter holder of the present invention, indicated generally by the reference character 2, when in use is secured to the arm 4 of a key slotting machine, indicated in Figure 1, by means such as clamping means 6, which retains the upper end of the shank of the holder within the slot in the arm of the machine. Arm 4 of the machine is reciprocated in the direction of the length of the cutter holder, and is fed forward a slight amount to cut a progressively deeper kerf upon each reciprocation in the direction of the length of the arm 4 by means not a part of the invention.

Figure 5:
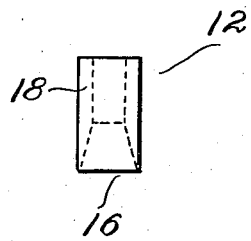
Figure 5 is a view in end elevation of such cutter.

The cutter holder consists of an upper elongated shank 8, which in the embodiment shown is rectangular in section, and a bottom tool holding section 10, which in such embodiment is circular in cross section and integral with the shank. The keyway cutter 12, which has an elongated shank 14 by which it is held in the cutter holder, has a forward lower cutting edge 16 located at the lower corner of the front face of the cutter, such face being positioned at an angle somewhat greater than 90 degrees with respect to the axis of shank 14. The side faces 18 leading from the front face toward the shank are inclined inwardly from such face to provide the proper clearance from the kerf, as more plainly evident in Figure 5.

The cutter is retained in the holder by the positioning of the shank 14 of the cutter within the slot 20 of the holder, said slot extending through the center of the holder in a direction at least substantially at right angles to the longitudinal axis of the holder and being of a size and shape so that it fits the opposite side surfaces of the shank very closely. In the design shown, the cutter holder is formed in two parts, the lower portion 22 being made separately from the main body portion of the holder and being welded to the holder to form a prolongation thereof, as shown, after the slot 20 has been formed. Since the slot is formed in what is then the bottom end of the holder, it may rapidly and and accurately be cut by means of a milling machine.

The bottom portion 22 of the holder is shown as provided with two cutter holding set screws 24 having a diameter substantially equal to the width of the slot 20 and being spaced along the transverse axis of the holder in the central plane of the slot. Although two set screws are shown, in certain instances one such set screw substantially centrally located has proved satisfactory. By reason of the accuracy of fit between the opposite side surfaces of the shank 14 of the cutter and the sidewalls of the slot 20 in the holder, as well as the broad bearing between the inner end of each set screw 24 and the bottom of the shank, the cutter is very stably and accurately held in the holder.

In order to minimize flexure of the projecting cutting end of the cutter, and thus to hold it still more accurately, there is provided a projecting backing-up portion 26 on the side of the holder on which the cutting edge of the tool is located, the bottom surface 28 of member 26 contacting the upper or rear surface of the projecting portion of the cutter at a point substantially in line with the cutting edge of the latter. Surface 28 is made of such size and shape as to contact substantially the entire rear surface of the cutting portion of the cutter projecting from the holder. As a consequence, the cutting edge is very rigidly held from deflection and by use of the holder even the deepest cuts may be made with great accuracy. Projection 26, which may conveniently be made separately and welded on to the tool holder as shown, is made of a width somewhat narrower than that of the cutting edge of the tool so that it may extend into the keyway cut by the tool without contacting the sides thereof.

Having thus fully described and illustrated a preferred embodiment of the keyway cutter holder of the present invention, I desire to claim as new the following.

I claim:

1. In the combination of a metal cutting keyway cutter having a shank and a cutting portion, said cutting portion having a cutting edge projecting from one end thereof and a cutter holder securing said cutter, the improved holder which comprises an elongated shank portion, a cutting tool holding portion coextensive with the shank of the holder, said tool holding portion having a slot therein extending substantially perpendicular to the axis thereof and of such width and shape as to fit the opposite side surfaces of the cutter shank closely, at least one set screw substantially perpendicular to the direction of the slot, said set screw extending through and having screw threaded engagement with the wall of the slot opposite the shank of the holder, said set screw having an inner end of substantially the same diameter as the width of the slot for engagement with the cutter shank, said cutter holding portion having a back-up portion projecting outwardly therefrom on the side of the slot toward the shank of the holder so as to engage the rear of the cutting portion of the cutter secured in the holder and to back it up in the vicinity at the rear of the cutting edge.

2. In the combination of a metal cutting keyway cutter having a shank and a cutting portion, said cutting portion having a cutting edge projecting from one end thereof and a cutter holder securing said cutter, the improved holder which comprises an elongated shank portion, a cutting tool holding portion coextensive with the shank of the holder, said tool holding portion having a slot therein extending substantially perpendicular to the axis thereof and of such width and shape as to fit the opposite side surfaces of the cutter shank closely, at least two set screws spaced along the length of the slot and positioned substantially perpendicular to the direction of the slot, said set screws extending through and having screw threaded engagement with the wall of the slot opposite the shank of the holder, said set screws each having an inner end of substantially the same diameter as the width of the slot for engagement with the cutter shank, said cutter holding portion having a back-up portion projecting outwardly therefrom on the side of the slot toward the shank of the holder so as to engage the rear of the cutting portion of the cutter secured in the holder and to back it up in the vicinity of the rear of the cutting edge, the back-up portion projecting from the holder having a width of the same order as but slightly less than, and projecting radially from the holder substantially the same distance as, the width of the cutting edge of the cutter and the distance which the rear of the cutter projects from the holder respectively.

3. In the combination of a metal cutting keyway cutter having a shank and a cutting portion, said cutting portion having a cutting edge projecting from one end thereof and a cutter holder securing said cutter, the improved holder which comprises an elongated shank portion, a cutting tool holding portion coextensive with the shank of the holder, said tool holding portion having a slot therein extending substantially perpendicular to the axis thereof and of such width and shape as to fit the opposite side surfaces of the cutter shank closely, at least one set screw substantially perpendicular to the direction of the slot, said set screw extending through and having screw threaded engagement with the wall of the slot opposite the shank of the holder, said set screw having an inner end of substantially the same diameter as the width of the slot for engagement with the cutter shank, said cutter holding portion having a back-up portion projecting outwardly therefrom on the side of the slot toward the shank of the holder so as to engage the rear of the cutting portion of the cutter secured in the holder and to back it up in the vicinity at the rear of the cutting edge, the back-up portion projecting from the holder having a width of the same order as but slightly less than, and projecting radially from the holder substantially the same distance as, the width of the cutting edge of the cutter and the distance which the rear of the cutter projects from the holder respectively.

WILLIAM J. BOYD, Jr.

REFERENCES CITED

The following references are of record in the file of this patent:

UNITED STATES PATENTS

| Number | Name | Date |
|---|---|---|
| 333,324 | Morton | Dec. 29, 1885 |
| 540,095 | Giesler et al. | May 28, 1895 |
| 655,432 | Catlin | Aug. 7, 1900 |
| 748,844 | Colburn | Jan. 5, 1904 |
| 827,816 | Owen | Aug. 7, 1906 |
| 1,410,451 | Bullard | Mar. 21, 1922 |